United States Patent [19]

Huber

[11] 4,105,187

[45] Aug. 8, 1978

[54] SEALING SYSTEM FOR SHUTOFF UNITS

[75] Inventor: Richard Huber, Mödling bei Vienna, Austria

[73] Assignee: Klinger AG, Zug, Switzerland

[21] Appl. No.: 728,961

[22] Filed: Oct. 4, 1976

[30] Foreign Application Priority Data

Oct. 9, 1975 [CH] Switzerland ............... 13142/75

[51] Int. Cl.$^2$ ................................................ F16K 1/38
[52] U.S. Cl. ........................................................ 251/334
[58] Field of Search ............... 251/333, 334, 210, 332; 137/329.05

[56] References Cited

U.S. PATENT DOCUMENTS

| 908,138 | 12/1908 | Ricksecker, Jr. ............ 251/333 X |
| 1,234,096 | 7/1917 | Farrell ............... 251/333 X |

FOREIGN PATENT DOCUMENTS

| 666,167 | 10/1938 | Fed. Rep. of Germany ........... 251/210 |
| 390,695 | 4/1933 | United Kingdom ............. 251/210 |
| 943,233 | 12/1963 | United Kingdom ............. 251/334 |

*Primary Examiner*—Arnold Rosenthal
*Attorney, Agent, or Firm*—Karl W. Flocks

[57] ABSTRACT

A sealing system for a shutoff unit comprising two substantially ring-shaped sealing elements, one of which is tightly connected with the housing or with the blocking element of the shutoff unit and the other is either tightly connected with the blocking element or the housing or is formed thereat. The sealing elements are pressed against one another due to a closing movement of the blocking element for carrying out a shutoff action. The one sealing element is constructed as a thin-wall body of undulated or wave-shaped cross-section and elastically deformable under the action of the closing force, said elastically deformable thin-wall body extending over the ring width of the corresponding sealing element and in the closed position, with deformation of its wall, bearing by means of wave peaks protruding from one side of the thin-wall body against the other sealing element at least at two ring regions with line contact. The blocking element or housing which is connected with the thin-wall body possesses beneath these ring regions free deformation spaces for its wall and adjacent such spaces a respective support extending parallel to the ring region for each wave peak protruding from the other side of the thin-wall body. The marginal regions of the ring-shaped thin-wall body of undulated cross-section are prevented from moving in a manner which would increase the ring width.

3 Claims, 1 Drawing Figure

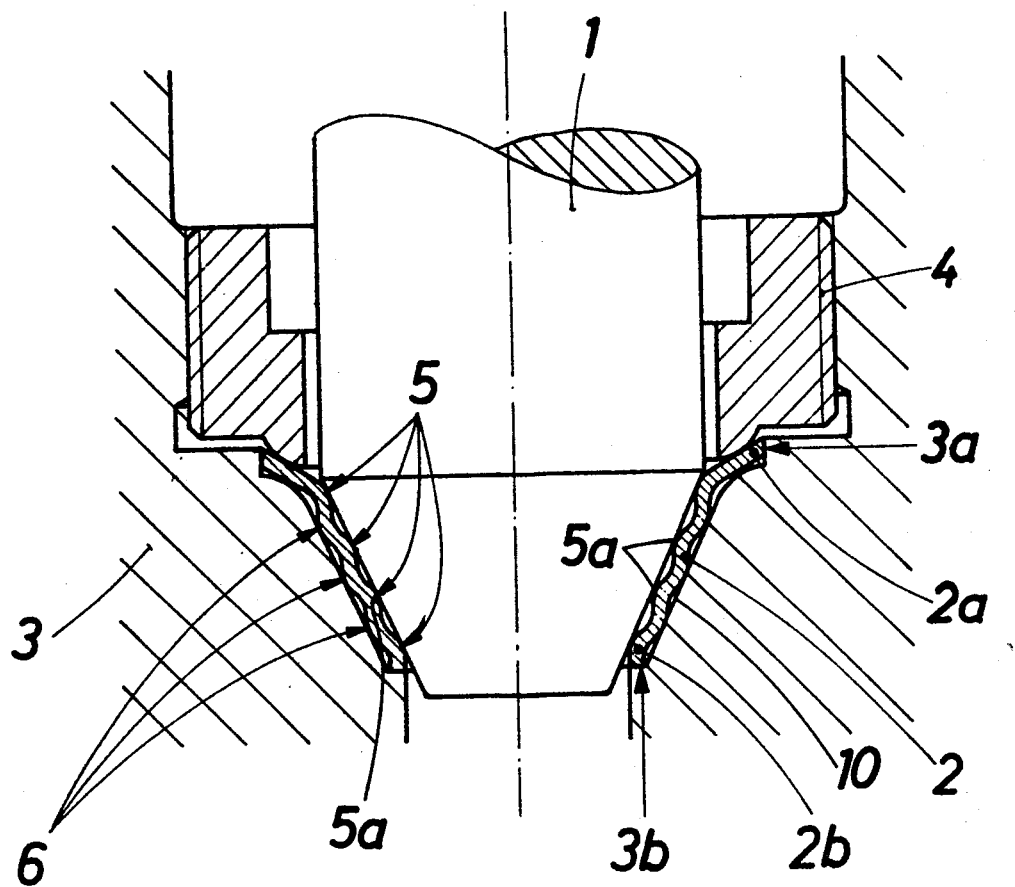

SEALING SYSTEM FOR SHUTOFF UNITS

BACKGROUND OF THE INVENTION

The present invention relates to a sealing system for shutoff units which is of the type comprising two substantially ring-shaped sealing units, one of which is sealingly or tightly connected with the housing or the blocking element of the shutoff unit and the other of which is either sealingly connected with the blocking element or the housing, respectively, or is formed thereat itself, and the sealing elements for accomplishing the shutoff action can be pressed against one another by a closing movement of the blocking element. The one sealing element is constructed as a thin-wall body of substantially undulated or wave-shaped cross-section which is elastically deformable under the action of the closing force, this thin-wall body extending over the ring width of the corresponding sealing element and in the closed position, while deforming its wall, bearing by means of the wave peaks protruding from one side of the thin-wall body at the other sealing element at least at two ring regions with line contact. The blocking element or housing which is operatively associated with the thin-wall body has, beneath these ring regions, free deformation spaces for its wall and adjacent such spaces a respective support extending parallel to the ring regions for each wave peak protruding from the other side of the thin-wall body.

Such type sealing systems combine the advantages of so-called "soft" seats with those having metallic seats because, on the one hand, they are also suitable for use at considerably greater operating temperatures than such would be possible in the case of "soft" organic sealing material, and, on the other hand, do not possess any rigid, rather a flexible elastic seat.

SUMMARY OF THE INVENTION

It is a primary object of the present invention to improve upon valve structures of the previously mentioned type.

In keeping with this objective the invention contemplates that the marginal regions of the ring-shaped thin-wall body of wave-shaped or undulated cross-section is prevented from carrying out a movement in the sense of increasing the ring width.

In this manner there is achieved the result that at the ring regions which become effective and have line contact the surface compression is uniformly distributed and, therefore, there is obtained a uniform sealing action with relatively low contact forces. Since at the thin-wall body there cannot occur any stress relief due to deformation of the entire body while decreasing its ring height and increasing its ring width, the waves provided between the marginal regions bear under the closing force, on the one hand, uniformly at the supports and, on the other hand, at the other sealing element, in that the wave peaks or wave portions which initially come into contact deform and thus lift the non-contacting or weaker contacting wave peaks or wave peak portions, so that there results an equalization of the surface compression in the manner of a hydraulic body. This uniformly distributed surface compression which occurs at the ring regions with line contact can be accommodated to the momentary pressure of the medium by changing the closing force. With increasing closing force the thin-wall body increasingly deforms less in the sense of a reduction of the ring height.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE shows in longitudinal cross-sectional view a sealing system for shutoff units constructed according to the present invention.

DETAILED DESCRIPTION OF THE PREFERRED EMBODIMENTS

Describing now the drawing, there is illustrated therein a sealing system, constructed according to the teachings of the invention, for a valve having a conical blocking element or valve cone 1. A substantially ring-shaped thin-wall body 2 is attached in a housing 3 by means of a clamping ring 4 which provides a tight connection. The ring-shaped thin-wall body 2 possesses, at the side directed towards the valve cone 1, four wave-like or undulated regions or peaks 5 which, in the illustrated closed position, bear with line contact by means of four ring regions 5a at the blocking element 1. Between these wave peaks 5 there extend from the other side of the ring-shaped thin-wall body 2 three wave peaks 6 which are supported at the conical bore 10 in the housing 3. The marginal or end regions 2a and 2b of the thin-wall body 2, in the mounted state of the structure, bear at shoulders 3a and 3b respectively, of the housing 3, so that there is not possible any movement of these marginal regions 2a and 2b in the sense of increasing the ring width.

The stresses arising in the thin-wall body 2 in the presence of the closing force, compensate one another, while deforming individual parts of the thin-wall body, for such length of time until the ring regions bear with uniform line contact at the valve cone 1. Consequently, the surface compression is compensated in each instance at least in one ring region and to a certain degree also with respect to all ring regions. In the event that the closing force further increases, then there occurs a widening of the contact lines, so that the entire thin-wall body 2 increasingly behaves in the manner of a rigid thick-wall body, which practically therefore does not deform. The thin-wall body thus possesses a progressive spring characteristic. The inventive sealing system therefore has the advantage that a sealing action positively takes place at a number of ring regions with as low as possible closing force, and there is eliminated damaging squeezing of the thin-wall body 2 with attendant loss of its sealing capability.

While there are shown and described present preferred embodiments of the invention, it is to be distinctly understood that the invention is not limited thereto, but may be otherwise variously embodied and practiced within the scope of the following claims. Accordingly,

What is claimed is:

1. A sealing system for a shutoff unit comprising
   housing and blocking members of the shutoff unit,
   an annular metallic sealing element having a thin walled portion which is elastically deformable under a closing force between said housing and blocking members of said shutoff unit,
   at least two annular supporting areas on each of said housing and blocking members which under the closing force make sealing linear contact with and deform said thin walled portion of said sealing element, and free spaces for deformation of said thin walled portion therein, under the maximal closing force on opposite sides of said thin walled portion from each of said annular supporting areas and enclosed by said thin walled portion and said other member than said member making the linear contact at the annular supporting area, said annular supporting areas adjacent each of said free spaces for deformation, and said spaces on a member extending substantially parallel to said supporting areas on said same member, means for restricting the movement of the peripheral edges of said sealing element to prevent increasing said ring width of said sealing element including means for restrictively holding one of the peripheral edges against movement while the opposite peripheral edge extends into unattached abutting relationship with one of said members of the shut-off unit, said sealing element having a predetermined ring width with said thin walled portion having a substantially same thickness at least along the portion extending out of the restrictively held peripheral edge.

2. The sealing system of claim 1, further characterized by said blocking member having a conical shaped region.

3. The sealing system of claim 1, further characterized by said means for restricting movement including shoulder portions on said housing member partially enclosing said sealing element between them.

* * * * *